Patented Nov. 11, 1924.

1,515,079

UNITED STATES PATENT OFFICE.

VERNON T. STEWART, OF MONTCLAIR, NEW JERSEY.

MANUFACTURE OF ARSENIC ACID.

No Drawing. Application filed September 18, 1922. Serial No. 588,998.

*To all whom it may concern:*

Be it known that I, VERNON T. STEWART, a citizen of the United States, and a resident of Montclair, in the county of Essex and State of New Jersey, have invented certain new and useful Improvements in the Manufacture of Arsenic Acid, of which the following is a specification.

This invention relates to the production of arsenic acid from white arsenic or arsenic material in a lower stage of oxidation and relates particularly to the treatment of white arsenic with chlorine.

The oxidation of white arsenic to arsenic acid in aqueous suspension or solution by means of chlorine or a chlorine-containing gas is best carried out with the solution hot preferably at the boiling point. Under these conditions arsenic chloride or similar volatile compounds may be formed and be carried over with the hydrochloric acid into the absorbing system thus contaminating the hydrochloric acid obtained as a by-product and at the same time constituting a loss in yield of arsenic acid. Experiments made by me show that the arsenic chloride or other volatile arsenic compound may be retained in the reaction vessel by the use of a reflux condenser. The latter preferably is water-cooled.

As an example equal parts by weight of white arsenic and water are placed in a closed vessel equipped with a reflux condenser. The contents of the vessel are heated to boiling and chlorine gas is slowly passed into the mixture, while refluxing, until tests show the white arsenic has been completely converted into arsenic acid. During this operation any hydrochloric acid gas escaping from the reflux condenser may be passed into a water scrubber. The time of treatment will vary with the quantity of material and the rate of introduction of chlorine and usually requires several hours for completion. At the close of the operation the arsenic acid admixed with hydrochloric acid may be heated to expel the latter or otherwise treated or purified.

What I claim is:—

1. The process of making arsenic acid which comprises treating white arsenic in the presence of water at the boiling point with chlorine gas and refluxing the reaction mixture during the conversion whereby distillation of chloride of arsenic or other volatile arsenic compounds is avoided.

2. The process of making arsenic acid which comprises exposing arsenic material in a lower stage of oxidation in the presence of heated water to the action of chlorine and in refluxing the mixture during the operation to prevent the distillation of volatile arsenic compounds whereby a full yield of arsenic acid is obtained and hydrochloric acid of good purity recovered as a by-product.

3. The process of making arsenic acid which comprises exposing arsenic material in a lower stage of oxidation in the presence of about an equal quantity of heated water to the action of chlorine and refluxing the mixture during the operation to prevent the distillation of volatile arsenic compounds whereby a full yield of arsenic acid is obtained and hydrochloric acid of good purity recovered as a by-product.

VERNON T. STEWART.